United States Patent [19]

Kinoshita et al.

[11] Patent Number: 5,703,465
[45] Date of Patent: Dec. 30, 1997

[54] METHOD AND APPARATUS FOR CONTROLLING THE CHARGING OF A SECONDARY BATTERY USING THE PRIMARY DIFFERENTIAL OF THE BATTERY VOLTAGE

[75] Inventors: Naoki Kinoshita; Kazuya Oozono, both of Wako, Japan

[73] Assignee: Honda Giken Kogyo Kabushiki Kaisha, Tokyo, Japan

[21] Appl. No.: 655,003

[22] Filed: May 29, 1996

[30] Foreign Application Priority Data

May 31, 1995 [JP] Japan ................................. 7-134324

[51] Int. Cl.$^6$ .......................... H01M 10/44; H01M 10/46
[52] U.S. Cl. ........................... 320/22; 320/35; 320/39; 320/46
[58] Field of Search ..................... 320/5, 21, 22, 320/23, 30, 35, 36, 39, 40, 46

[56] References Cited

U.S. PATENT DOCUMENTS

| | | | |
|---|---|---|---|
| 5,140,252 | 8/1992 | Kitzu et al. | 320/20 |
| 5,444,353 | 8/1995 | Shinohara et al. | 320/39 |

FOREIGN PATENT DOCUMENTS 4-217826  8/1992  Japan.

*Primary Examiner*—Edward Tso
*Attorney, Agent, or Firm*—Armstrong, Westerman, Hattori, McLeland & Naughton

[57] ABSTRACT

A secondary battery is charged with a large current after a time when a voltage across the secondary battery becomes equal to or greater than a decision value while the secondary battery is being charged, until a primary differential of the voltage reaches a decision value which is a threshold for the primary differential which is established depending on the temperature of the secondary battery. When the primary differential reaches the decision value at a time, the charging of the secondary battery with the large current is finished. By monitoring the quadratic differential, it is possible to distinguish an increase in the voltage in an initial charging period from an increase in the voltage in a terminal charging period. After an increase in the voltage in terminal charging period is detected, the end of the charging process is decided based on the decision value of the primary differential of the voltage. Because the time at which the secondary battery is fully charged can accurately be detected, the secondary battery can reliably be fully charged, and is prevented from being unduly excessively charged.

16 Claims, 8 Drawing Sheets

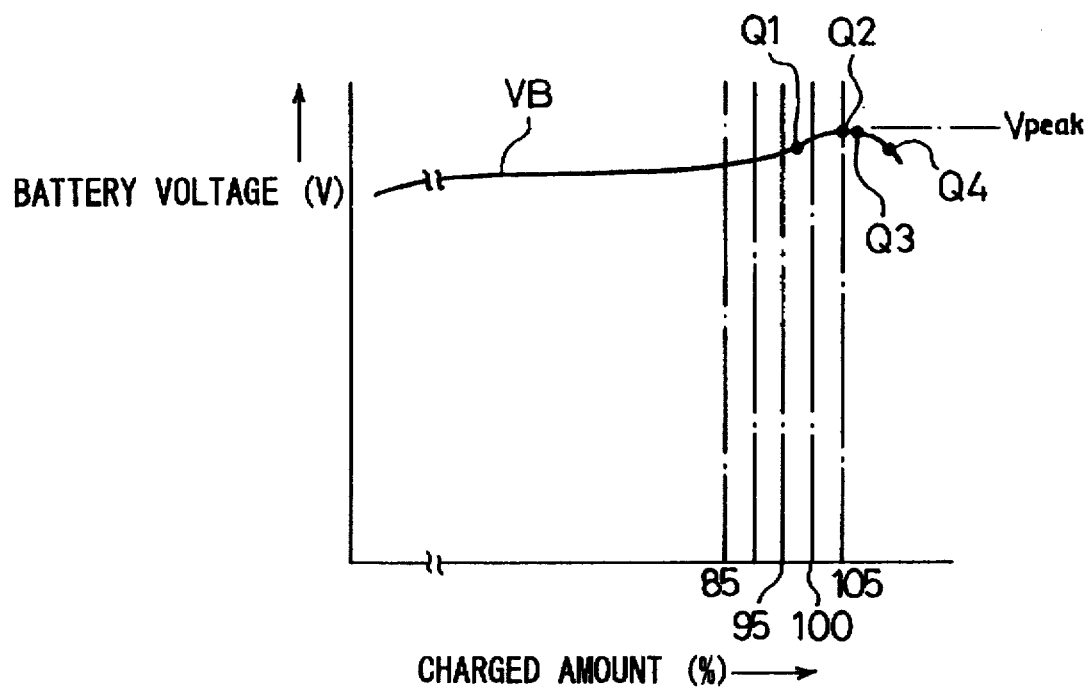

METHOD AND APPARATUS FOR CONTROLLING THE CHARGING OF A SECONDARY BATTERY USING THE PRIMARY DIFFERENTIAL OF THE BATTERY VOLTAGE

BACKGROUND OF THE INVENTION

1. Field of the Invention

The present invention relates to a method of and an apparatus for controlling the charging of a nickel-based secondary battery such as a nickel-cadmium secondary battery, a nickel-metal hydride secondary battery, or the like for energizing a propulsive motor on an electrically propelled vehicle.

2. Description of the Related Art

If a nickel-based secondary battery is used as a battery for energizing a propulsive motor on an electrically propelled vehicle, then it is preferable to charge the battery to an adequately fully charged condition (95% charged condition) equal to or lower than a 100% charged condition in order to increase the distance that the electrically propelled vehicle can travel per charging cycle and also to increase the service life of the battery.

It is also preferable to detect the adequately fully charged condition and supervise the battery not to charge the battery beyond the adequately fully charged condition, i.e., not to excessively charge the battery, or to charge the battery with a small current in the event that the battery should be excessively charged. If the battery happens to be excessively charged with a large current, then the battery will be degraded and its service life will unduly be shortened.

One known process of detecting the time when a secondary battery is fully charged is disclosed in Japanese laid-open patent publication No. 4-217826.

FIG. 8 of the accompanying drawings is a graph showing the voltage across the secondary battery which is charged according to the disclosed process. In FIG. 8, the vertical axis of the graph represents a battery voltage B and the horizontal axis represents a charged amount of the battery with its capacity indicated in units of ampere hour (Ah), the rated capacity being equal to a charged percentage of 100%. When the battery is charged with a constant current, the charged amount is substantially proportional to time. When the battery is charged with a constant electric power, since the voltage increases and the current decreases as the charging progresses, the charged amount is not proportional to time. In the above publication, the horizontal axis of the graph actually represents a charged time, and the value of the charged amount (indicated by a percentage) on the horizontal axis is based on the finding of the inventor of the present application.

According to the disclosed process, when a nickel-based secondary battery is charged, a quadratic differential $d^2VB/d^2$ (t is time) of the battery voltage VB of the secondary battery is calculated, and an inflection point Q1 (a point where the curve changes from an upward concave to a upward convex) of the quadratic differential is determined. After the inflection point Q1 is detected, the secondary battery is judged as being substantially fully charged at a point Q2 when a primary differential $dVB/dt$ of the battery voltage VB is zero or at a point Q3 when the primary differential $dVB/dt$ is of a negative value, and then the charging process is finished or the charging current is reduced.

The disclosed process is more advantageous than a process of determining the secondary battery as being fully charged at a point Q4 when the battery voltage VB drops a certain voltage from a peak Vpeak of the battery voltage VB after the peak Vpeak is detected, because the battery voltage VB is detected at a time closer to the time when the secondary battery is fully charged, i.e., when the charged amount is 100%.

However, as can be seen from FIG. 8, the secondary battery is charged to about 105% or more at the time Q2 or Q3. Since the secondary battery is charged beyond the adequately fully charged condition (95% charged condition), the battery starts being degraded, and hence the process is not suitable to increase the service life of the secondary battery.

The inventor has found, as shown in FIG. 8, that in order to charge the secondary battery to 95%, it is preferable to stop charging the secondary battery when the primary differential $dVB/dt$ of the battery voltage VB is of a positive value.

The characteristics with which the battery voltage VB varies differs depending on the environments in which the secondary battery is charged, e.g., the temperature of the secondary battery, and also varies depending on the depth of charge (DOD) of the secondary battery.

Therefore, even when the quadratic and primary differentials of the battery voltage VB are used, as with the proposed process, it is impossible to charge the secondary battery to the adequately fully charged condition while increasing the service life of the battery in various charging environments.

SUMMARY OF THE INVENTION

It is a general object of the present invention to provide a method of and an apparatus for controlling the charging of a secondary battery to be able to adequately determine the charging of the secondary battery in various charging environments for charging the secondary battery to an adequately fully charged condition and hence preventing the secondary battery from being unduly degraded.

Another object of the present invention is to provide a method of and an apparatus for controlling the charging of a secondary battery which comprises unit cells to be able to charge all the unit cells to an adequately fully charged condition.

Still another object of the present invention is to provide a method of and an apparatus for controlling the charging of a secondary battery to be able to reliably charge the secondary battery to an adequately fully charged condition even when the depth of charge of the secondary battery is low.

Yet still another object of the present invention is to provide a method of and an apparatus for controlling the charging of a secondary battery to be able to indicate a degraded condition of the secondary battery.

The above and other objects, features, and advantages of the present invention will become more apparent from the following description when taken in conjunction with the accompanying drawings in which a preferred embodiments of the present invention is shown by way of illustrative example.

BRIEF DESCRIPTION OF THE DRAWINGS

FIG. 8 is a diagram showing how a battery voltage varies depending on a charged amount.

DETAILED DESCRIPTION OF THE PREFERRED EMBODIMENT

Figure 1:
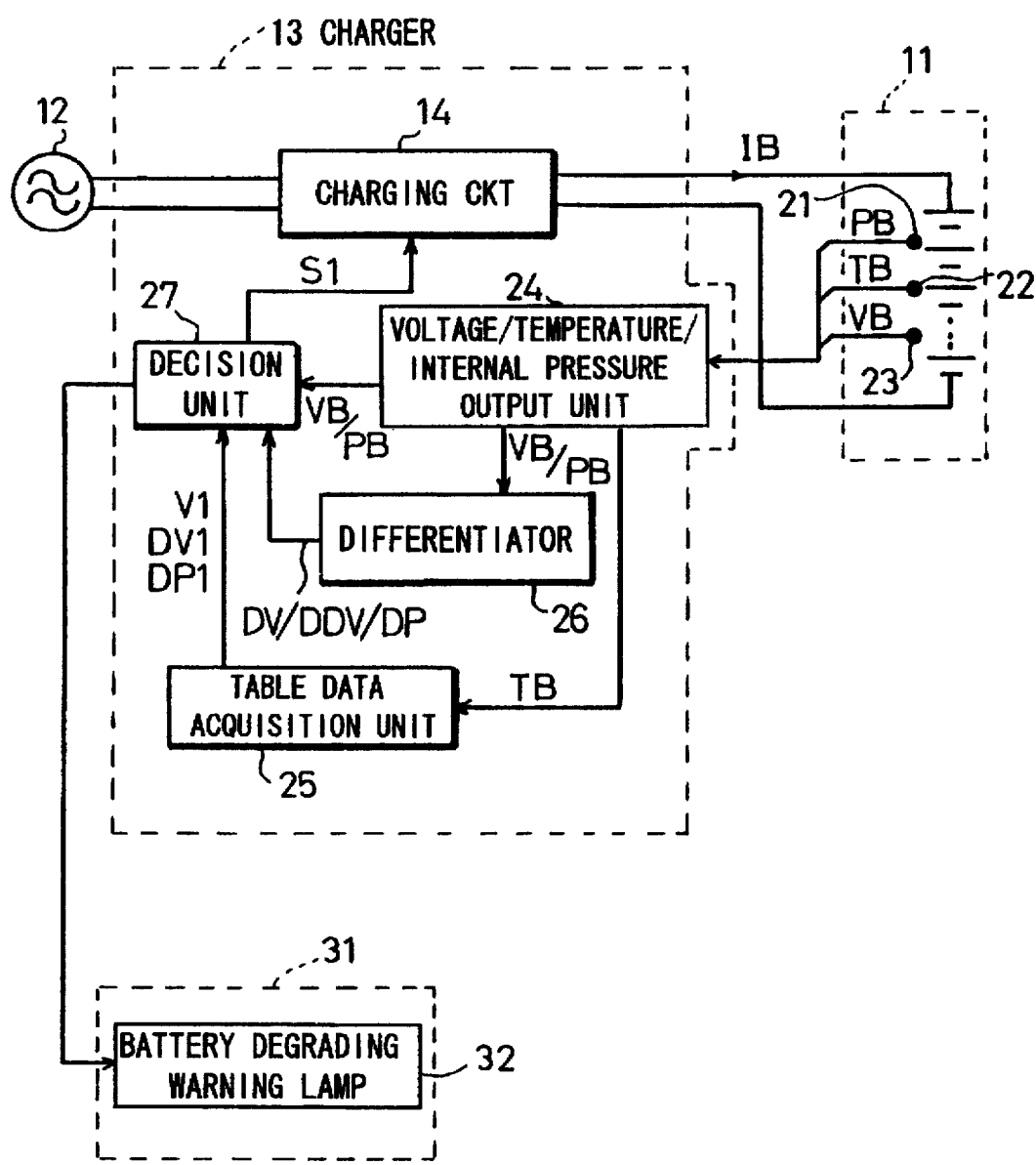
FIG. 1 is a block diagram of a charging control system to which the principles of the present invention are applied.

Those parts or concepts shown in FIGS. 1 through 7 which are identical to those shown in FIG. 8 are denoted by identical reference numerals, and will not be described in detail below.

FIG. 1 shows in block form a charging control system to which the principles of the present invention are applied.

As shown in FIG. 1, a nickel-metal hydride secondary battery 11 mounted on an electrically propelled vehicle for energizing a propulsive motor thereof is charged by a direct current which is converted from an alternating current from an alternating-current power supply 12 by a charging circuit 14 of a charger 13 which operates as a controller. All components of the charging control system, except the alternating-current power supply 12, are mounted on the electrically propelled vehicle.

The value of a charging current IB supplied to the battery 11 is controlled by a control signal S1 supplied from a decision unit 27 to the charging circuit 14. Usually, the charging circuit 14 charges the battery 11 in a constant-current charging control mode or a constant-power charging control mode. If the charging circuit 14 charges the battery 11 in a two-stage charging control mode, however, it charges the battery 11 with a relatively large constant electric power or current in a first stage, and charges the battery 11 with a relatively small constant current in a second stage.

An internal pressure PB of the battery 11 is continuously detected by a pressure sensor 21, and a temperature TB of the battery 11 is continuously detected by a temperature sensor 22. A voltage VB across the battery 11 is continuously detected by a voltage sensor 23. The battery 11 comprises a plurality of, e.g., 24, series-connected unit cells each having a rated voltage of 12 V, for example, and the detected voltage VB is the sum voltage (rated voltage of 288 V) of the series-connected unit cells. However, as described later on, the voltage VB handled as voltage data by the decision unit 27 is the voltage of a unit cell. Therefore, the voltage VB which will be referred to represents the voltage across a unit cell. The battery 11 may be referred to as an assembly battery to distinguish from the unit cells.

The internal pressure PB, the temperature TB, and the voltage VB which are detected are supplied to a voltage/temperature/internal pressure output unit 24. The voltage/temperature/internal pressure output unit 24 basically comprises an A/D (analog-to-digital) converter for converting the internal pressure PB, the temperature TB, and the voltage VB into respective digital values which will also be labeled as PB, TB, VB. Actually, the voltage VB is outputted as a value which is produced by dividing the detected voltage of the assembly battery 11 by the number of unit cells of the assembly battery 1 in the voltage/temperature/internal pressure output unit 24.

The temperature TB outputted from the voltage/temperature/internal pressure output unit 24 is supplied to a table data acquisition unit 25, and the voltage VB and the internal pressure outputted from the voltage/temperature/internal pressure output unit 24 are supplied respectively to a differentiator 26 and the decision unit 27.

The differentiator 26 calculates a primary differential DV of the voltage VB, a quadratic differential DDV of the voltage VB, and a primary differential DP of the internal pressure PB according to the following equations (1)–(3), and supplies the calculated differentials DV, DDV, DP to a measurement data input terminal of the decision unit 27:

$$DV=\{VB(t)-VB(t-\Delta t)\}/\Delta t \quad (1)$$

$$DDV=\{DV(t)-DV(t-\Delta t)\}/\Delta t \quad (2)$$

$$DP=\{PB(t)-PB(t-\Delta t)\}/\Delta t \quad (3)$$

where t represents a time and $\Delta t$ represents a small time.

Instead of the primary differential DV of the voltage VB, the quadratic differential DDV of the voltage VB, and the primary differential DP of the internal pressure PB, differences DVd, DDVd, DPd calculated according to the following equations (4)–(6) may be supplied to the measurement data input terminal of the decision unit 27:

$$DVd=\{VB(t)-VB(t-\Delta t)\} \quad (4)$$

$$DDVd=\{DV(t)-DV(t-\Delta t)\} \quad (5)$$

$$DPd=\{PB(t)-PB(t-\Delta t)\} \quad (6)$$

Using the supplied temperature TB as a memory address, the tape data acquisition unit 25 reads a decision value (threshold value) V1 for the voltage VB, a decision value (threshold value) DV1 (positive value) for the primary differential DV of the voltage VB, and a decision value (threshold value) DP1 for the primary differential DP of the internal pressure PB from tables (described below), and supplies the read decision values to a reference data input terminal of the decision unit 27. The tape data acquisition unit 25 stores a temperature vs. voltage table and a temperature vs. primary differential pressure table for deriving the decision values V1, DV1, DP1 from the temperature TB.

The decision unit 27 compares the measured data (or calculated data) VB, PB, DV, DDV, DP with the decision values V1, DV1, DP1 or stored decision values (described later on), and outputs a control signal S1 to control the charging circuit 14 based on the results of comparison, and also controls a battery degrading warning lamp 32 of an indicator 31 on a dashboard or the like of the electrically propelled vehicle. The battery degrading warning lamp 32 may be replaced with a buzzer for producing sound or a speech output device for outputting synthesized speech to indicate a degraded condition of the battery, or both the battery degrading warning lamp 32 and such a buzzer or a speech output device may be employed.

The decision unit 27, the voltage/temperature/internal pressure output unit 24, the differentiator 26, and the table data acquisition unit 25 may be implemented by a microcomputer comprising a CPU, a ROM, a RAM, a counter, a timer, and an input/output interface.

An operation sequence of the charging control system shown in FIG. 1 for determining the end of a charging process and the degrading of the battery will be described below with reference to FIGS. 2 and 3. Control is carried out by the decision unit 27 unless otherwise specified.

Figure 4:
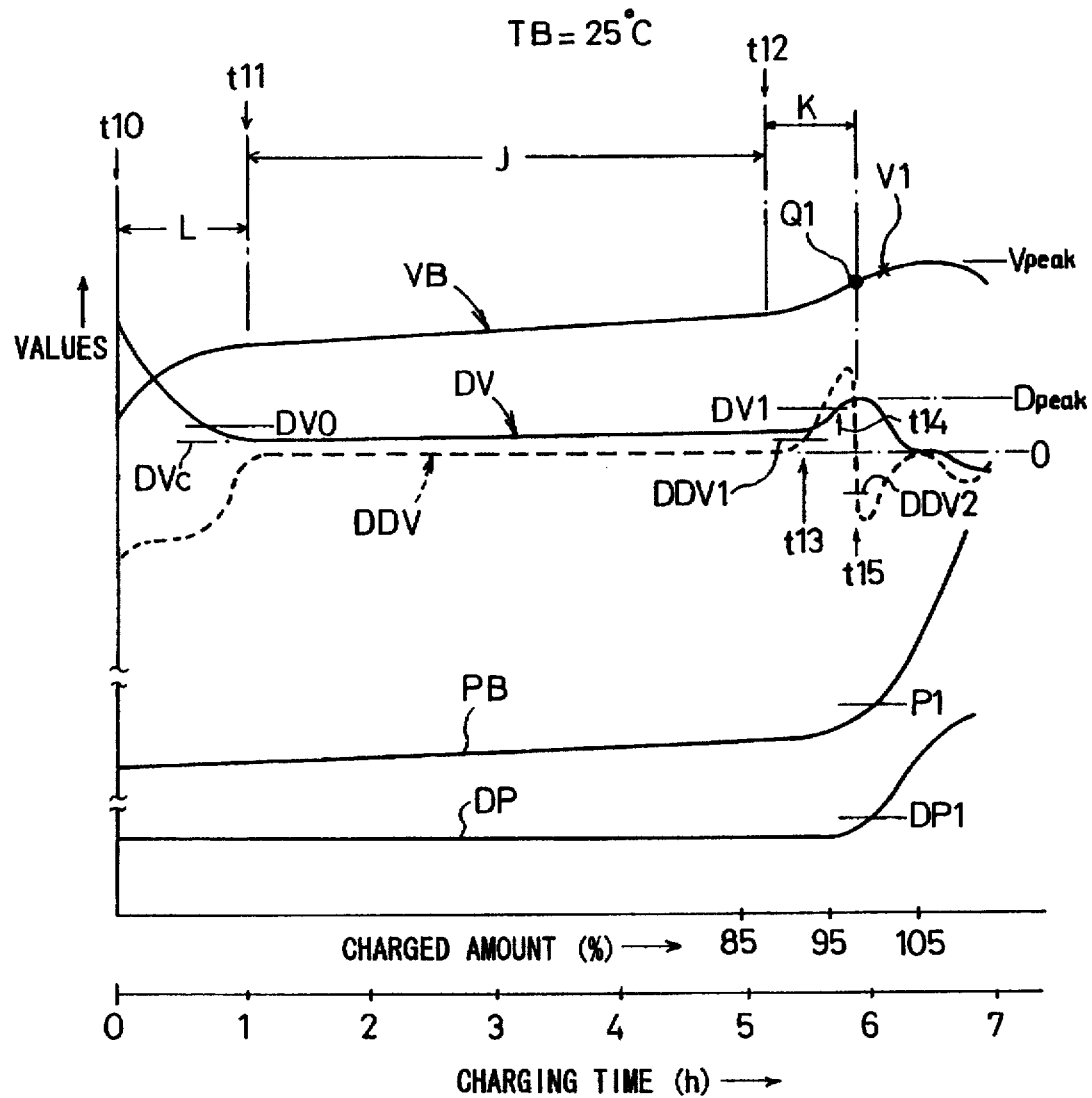
FIG. 4 is a graph illustrative of the operation sequence of the charging control system shown in FIG. 1.

FIG. 4 shows how the voltage VB, the primary differential DV of the voltage VB, the quadratic differential DDV of the voltage VB, the internal pressure PB, and the primary differential DP of the internal pressure PB vary with the charged amount (%) and the charging time (h) of the nickel-metal hydride secondary battery 11 when the battery temperature TB is 25° C.

Figure 2:
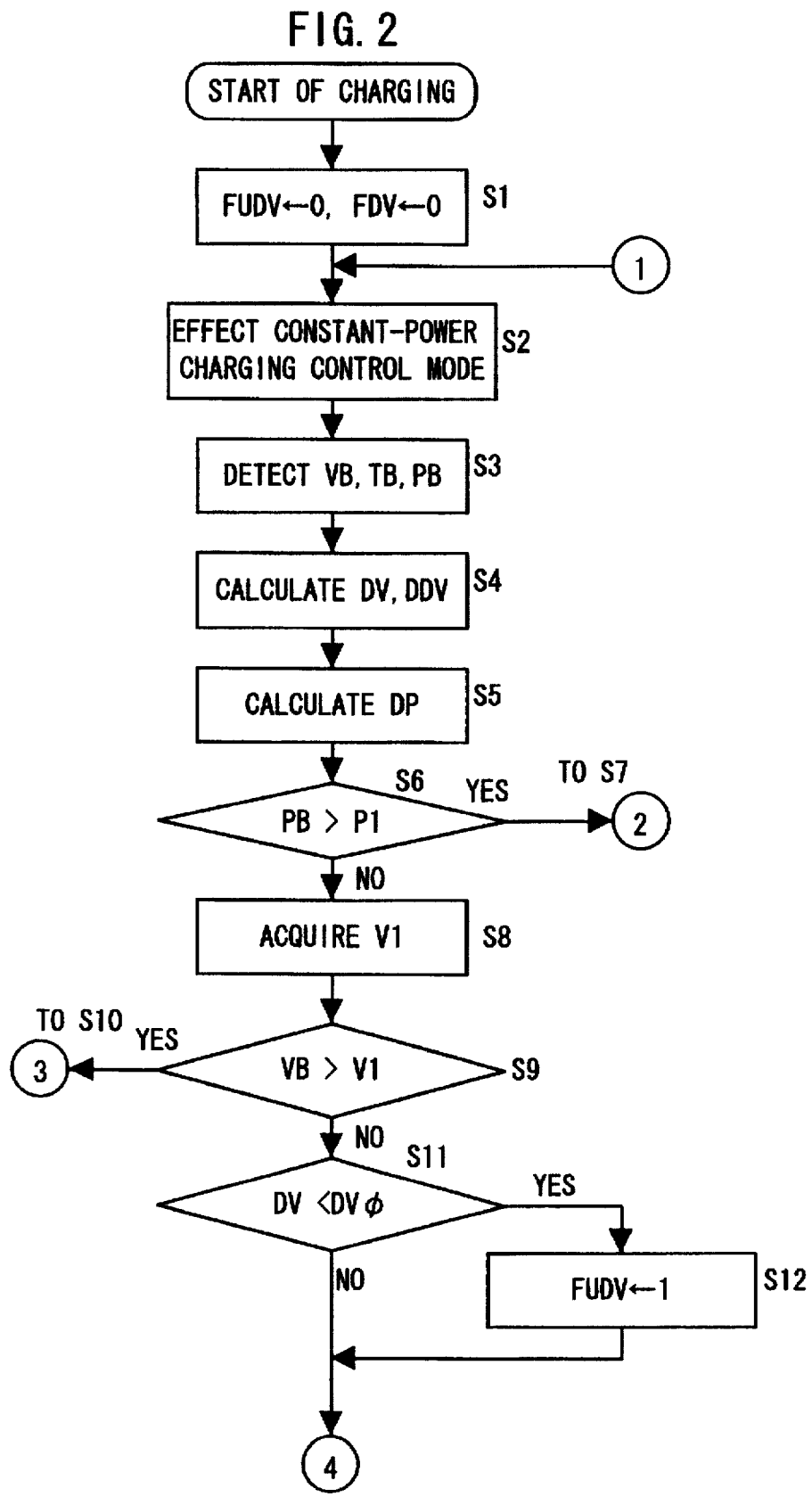
FIGS. 2 and 3 are flowcharts of an operation sequence of the charging control system shown in FIG. 1.
Figure 3:
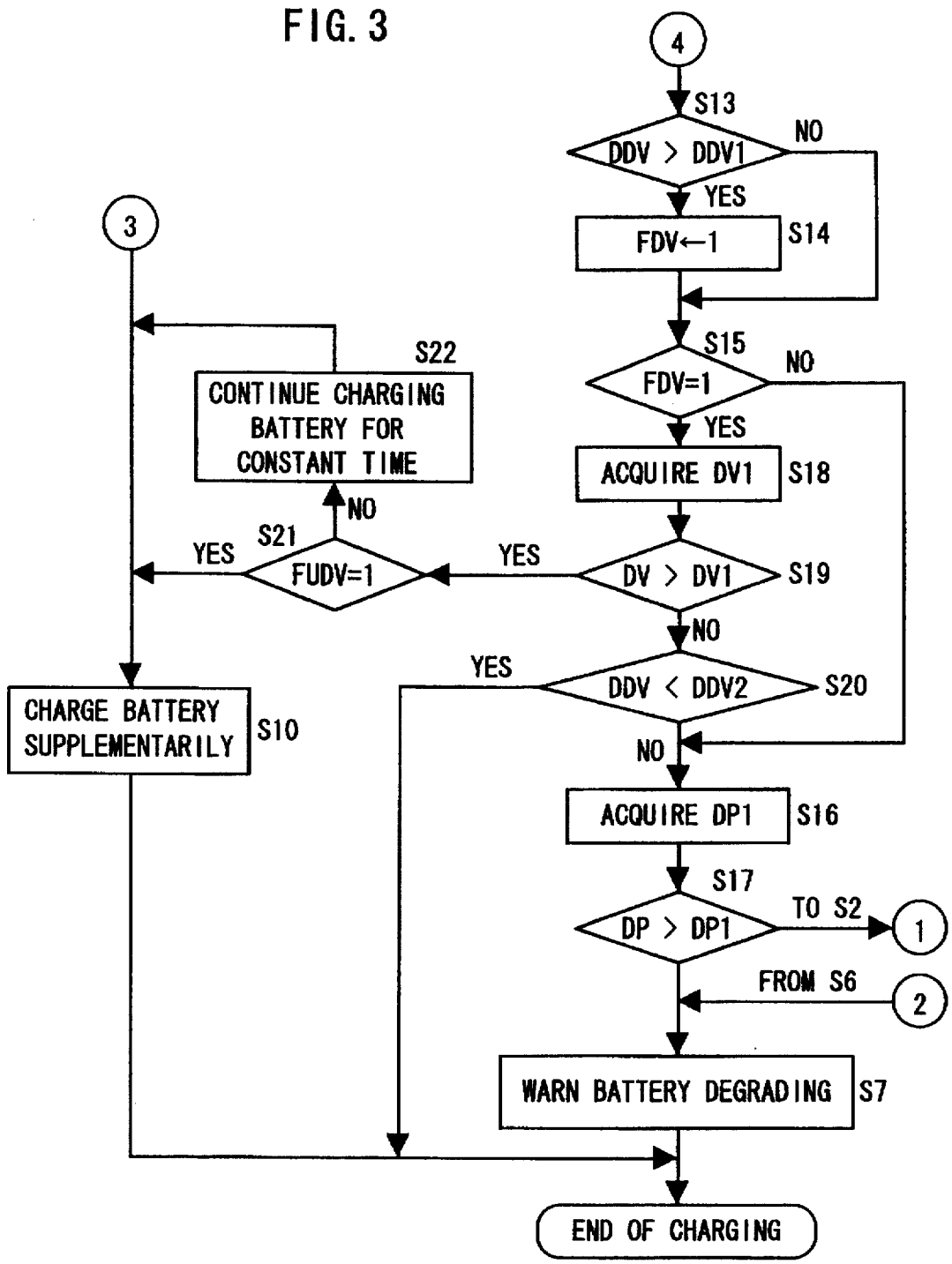

When the alternating-current power supply 12, the charging circuit 14, and the battery 11 are connected and a charging start switch (not shown) is closed, the operation sequence shown in FIGS. 2 and 3 begins, and the decision unit 27 resets a first-stage charging inhibit flag FUDV and a differential charging end decision control flag FDV for confirming the end of a charging control process with a differential (FUDV←0, FDV←0) in a step S1.

The decision unit 27 starts a charging control process at a time t10 (see FIG. 4) to charge the battery 11 in a constant-current charging control mode or a constant-power charging control mode. In the illustrated embodiment, the battery 11 is charged in the constant-power charging control mode with a relatively large current in a step S2.

At the same time the charging control process is started, the voltage VB, the internal pressure PB, and the temperature TB of the battery 11 are detected respectively by the voltage sensor 23, the pressure sensor 21, and the temperature sensor 22, and the voltage/temperature/internal pressure output unit 24 supplies digital values of the voltage VB, the internal pressure PB, and the temperature TB to the decision unit 27, the differentiator 26, and the table data acquisition unit 25 in a step S3.

The differentiator 26 calculates a primary differential DV indicative of a time-dependent change of the voltage VB {see the equation (1)} and its quadratic differential DDV {see the equation (2)} in a step S4, and also calculates a primary differential DP indicative of a time-dependent change of the internal pressure PB {see the equation (3)} in a step S5. The differentiator 26 supplies the calculated differentials DV, DDV, DP to the decision unit 27.

The decision unit 27 decides whether the internal pressure PB detected in the step S3 exceeds a predetermined internal pressure P1 (see FIG. 4) stored in the ROM or not in a step S6. If the internal pressure PB exceeds the predetermined internal pressure P1 ("YES" in the step S6, see the connector ② in FIGS. 2 and 3), then the decision unit 27 turns on the battery degrading warning lamp 32 in a step S7 (FIG. 3), and finishes the charging control process.

The predetermined internal pressure P1 is set to a value smaller than a pressure setting for an explosion-resistant relief valve (not shown) mounted in the case of the battery 11. If a hydrogen storage alloy in the electrodes of the battery 11 function normally, then generated hydrogen molecules are stored in the hydrogen storage alloy, and the internal pressure PB does not increase. However, if generated hydrogen molecules cannot be stored in the hydrogen storage alloy when the battery 11 is degraded due to excessive charging or the like, then the hydrogen molecules are trapped in the case of the battery 11, increasing the internal pressure PB in excess of the predetermined internal pressure P1. When the internal pressure PB increases in excess of the predetermined internal pressure P1, the pressure sensor 21 may possibly be subjected to a failure. Therefore, rather than turning on the battery degrading warning lamp 32, the decision unit 27 may give a general failure indication indicating that the battery 11 is degraded or the pressure sensor 21 fails. The predetermined internal pressure P1 may be set to a constant value such as of 1.7 kg/cm$^2$ as it does not need to vary depending on the ambient temperature TB.

If the internal pressure PB is of a normal value lower than the predetermined internal pressure P1 ("NO" in the step S6), then the decision unit 27 continues the charging control process.

Then, the tape data acquisition unit 25 refers to the temperature vs. voltage table based on the temperature TB detected in the step S3, and reads a division value V1 for the voltage VB and supplies the division value V1 to the decision unit 27 in a step S8.

Figure 5:
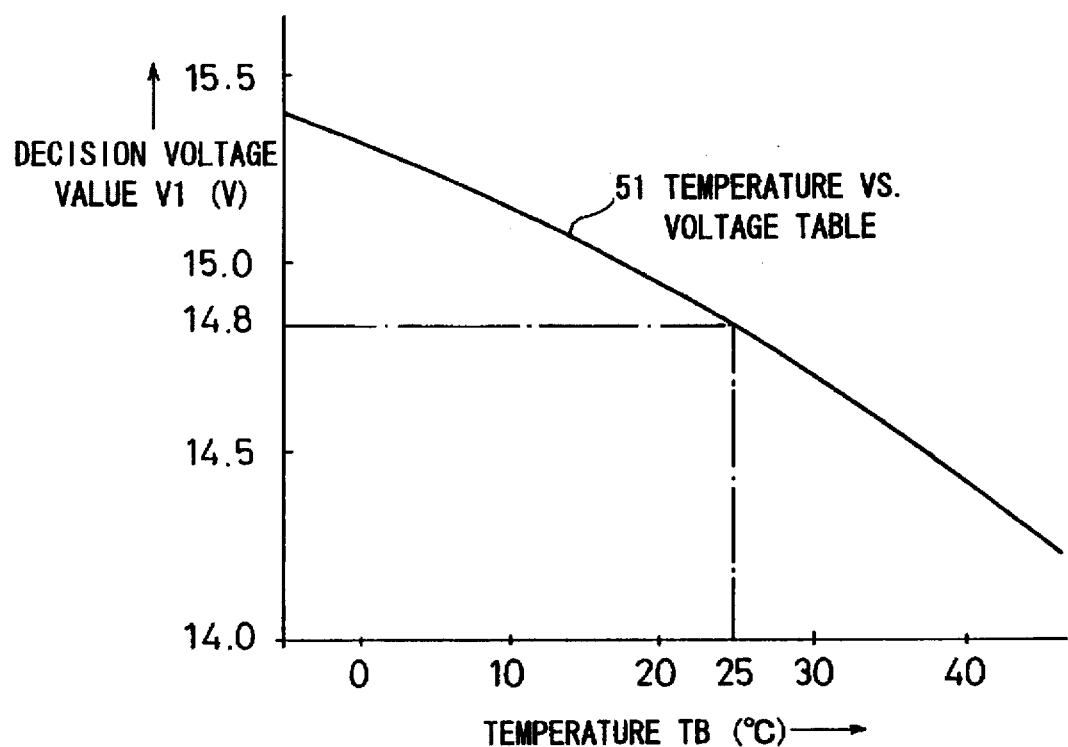
FIG. 5 is a diagram showing a temperature vs. voltage table.

FIG. 5 shows the temperature vs. voltage table, denoted by 51. The tape data acquisition unit 25 refers to the temperature vs. voltage table 51 to read the decision value V1 (see FIG. 4) corresponding substantially to an adequately fully charged condition (95% charged condition) which corresponds to the ambient temperature TB. Specifically, when the temperature TB is TB=25° C., the decision value V1 is set to V1=14.8 V. The temperature vs. voltage table 51 has been prepared by measuring voltage changes of the unit cells depending on the ambient temperature when the charged amount is 95%, and storing the measured voltage changes in the ROM of the table data acquisition unit 25. The voltage of the unit cells varies depending on the ambient temperature because the internal resistance of each cell (rated voltage of 1.2 V) of the unit cells is larger when the temperature TB is lower and smaller when the temperature TB is higher.

Then, the decision unit 27 decides whether the voltage VB detected in the step S3 is in excess of the decision value V1 or not in a step S9.

When the battery 1 is charged under usual conditions after it has been used, e.g., after the electrically propelled vehicle has run, the decision step S9 is not satisfied for the first time. However, when the electrically propelled vehicle has not run after the battery 11 was fully charged, i.e., when the depth of charge (DOD) of the battery 11 is close to 0%, the decision step S9 is satisfied.

If the decision step S9 is satisfied ("YES" in the step S9, see the connector ③ in FIGS. 2 and 3), then since the battery 11 is fully charged, the battery 11 is supplementarily charged in a second stage in a step S10, and then the charging thereof is finished. Specifically, the battery 11 is supplementarily charged in the second stage in a uniform charging control mode which is employed when the individual unit cells have different remaining capacities (charged amounts) due to repeated charging and discharging. Specifically, any unit cell whose charged amount is smaller than other unit cells before the battery 11 is charged cannot be fully charged when supplied with a predetermined electric power. The uniform charging control mode is carried out to avoid such an insufficient charging condition by excessively charging such a unit cell with a small current, e.g., of 1~3 A corresponding to 0.01 C~0.03 C (where C is the rated cell capacity) after the battery 11 has been charged in the first stage.

The charging in the second stage is finished when the integrated value of ampere hour in the second stage reaches a predetermined level. The integrated value may be calculated as the product of a preset charging current and a charging time by the decision unit 27. Alternatively, the charging current IB may be measured.

Then, the decision unit 27 decides whether the primary differential DV calculated in the step S4 is smaller than a predetermined primary differential DV0 (see FIG. 4) or not in a step S11. The predetermined primary differential DV0 is used to detect a charging period (also referred to as a constant charging period) J in which the voltage VB gradually increases in proportion to time except initial and terminal charging periods in which the voltage VB varies sharply. The predetermined primary differential DV0 is set to a value, e.g., of DV0=0.10, which is slightly greater than a constant primary differential DVc in the constant charging period J.

If the primary differential DV is smaller than the predetermined primary differential DV0 in the step S11, the decision unit 27 sets the first-stage charging inhibit flag FUDV to 1 (FUDV←1) in a step S12. Actually, the decision unit 27 decides whether the first-stage charging mode is inhibited or not based on whether a decision is made at a time T11 or T12, as described later on.

Irrespective of whether the primary differential DV is smaller or greater than the predetermined primary differential DV0, the decision unit 27 decides whether the quadratic differential DDV of the voltage VB is greater than a predetermined decision value DDV1 or not in a step S13. In view of the fact that in the constant charging period D, the primary differential DV is of a constant value and hence the quadratic differential DDV is zero, the predetermined decision value DDV1 is set to a value slightly larger than zero, e.g., to DDV1=0.02.

If the quadratic differential DDV of the voltage VB is greater than the predetermined decision value DDV1 in the step S13, then since the present time enters a period in which the rate of increase of the voltage VB is large, i.e., a period (referred to as a terminal charging period) K (see FIG. 4) in which the primary differential DV after the time T12 varies, the decision unit 27 sets the differential charging end decision control flag FDV to 1 for deciding the end of a charging process with the primary differential DV (FDV←1) in a step S14.

Then, the decision unit 27 decides whether the differential charging end decision control flag FDV is set (FDV=1) or not in step S15.

If the decision step S11 is not satisfied and the decision step S13 is not satisfied either (the decision step S15 is not satisfied), then the battery 11 is judged as being charged in an initial charging period L. If the decision step S11 is satisfied and the decision step S13 is not satisfied (the decision step S15 is not satisfied), then the battery 11 is judged as being charged in the constant charging period J. In any case, the constant-power charging control mode started in the step S2 is continued.

Before the constant-power charging control mode is continued, the decision unit 27 refers to the temperature vs. primary differential pressure table to read a decision value DP1 for the primary differential DP in a step S16.

Figure 6:
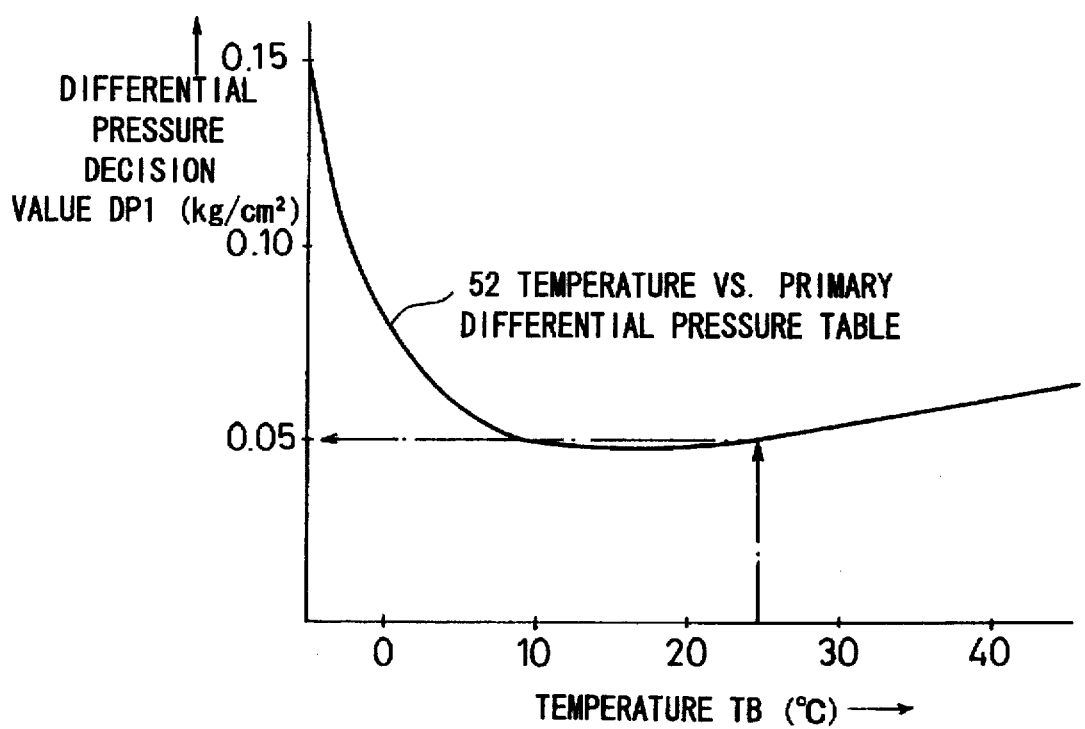
FIG. 6 is a diagram showing a temperature vs. primary differential pressure table.

FIG. 6 shows the temperature vs. primary differential pressure table, denoted by 52, which is stored in the ROM of the table data acquisition unit 25. When the temperature TB is TB=25° C., the decision value DP1 is set to DP1=0.05 kg/cm$^2$.

The decision unit 27 decides whether the present primary differential DP is greater than the decision value DP1 or not in a step S17. If the present primary differential DP is greater than the decision value DP1, then because the hydrogen storage reaction in the battery 11 is retarded, failing to store hydrogen molecules in the electrodes and the battery 11 is degraded, the decision unit 27 turns on the battery degrading warning lamp 32 in the step S7, and finishes the charging control process.

If the present primary differential DP is smaller than the decision value DP1, i.e., if the battery 11 is normal, then the charging process from the step S2 is repeated.

The decision step S17 using the primary differential DP may be replaced with a step of using the magnitude of the internal pressure PB itself as a decision value (P1 in FIG. 4), or both the primary differential DP and the magnitude of the internal pressure PB may be used in making a decision. Since the decision value DP1 suffers less variations than the decision value P1, it is possible to make more uniform decisions using the decision value DP1.

A process after the decision step S13 is satisfied, i.e., when a time T13 is detected in the terminal charging period K is detected, will be described below.

In this case, since the decision step S15 is satisfied, a charging control process with a differential in a step S18 and following steps is started.

The decision unit 27 refers the temperature vs. primary differential pressure table 52 to read a decision value DV1 (see FIG. 3) which is a threshold established depending on the temperature TB in the step S18. The temperature vs. primary differential pressure table 52 already been prepared. The decision value DV1 (DV1>0) is set to a value prior to an inflection point Q1 (a point where the curve changes from an upward concave to a upward convex) of the voltage VB, e.g., DV1=0.2 when the temperature TB is TB=25° C. Usually, the decision value DV1 is greater than the primary differential DV0 (DV1>DV0).

Then, the decision unit 27 decides whether the primary differential DV calculated in the step S4 is greater than the decision value DV1 or not in a step S19.

If the primary differential DV is smaller than the decision value DV1 ("NO" in the step S19), and also if the quadratic differential DDV is not smaller than a decision value DDV2 (described later on) ("NO" in a step S20), then the steps S16, S17, S2 described above are carried out until the step S19 is satisfied at a time T14.

If the primary differential DV is not greater than the decision value DV1 ("NO" in the step S19), and also if the quadratic differential DDV is smaller than the decision value DDV2 (see FIG. 4) ("YES" in a step S20), then the decision unit 27 judges the battery 11 as being excessively charged, and ends the charging process. The step S20 serves as a decision unit for performing a fail-safe function.

If the decision step S19 is satisfied and also if the first-stage charging inhibit flag FUDV is set (FUDV=1) ("YES" in a step S21), then since the fully charged time t14 is reliably detected, the decision unit 27 finishes the first-stage charging mode with a relatively large current, and then supplementarily charges the battery 11 in the second stage in the step S10, after which the charging process comes to an end.

If the first-stage charging inhibit flag FUDV is not set in the step S21, the decision unit 27 judges a halfway charging control process, and continues the charging of the battery 11 for a predetermined time in a step S22. Thereafter, the decision unit 27 supplementarily charges the battery 11 in the second stage in the step S10, and thereafter finishes the charging process.

Figure 7:
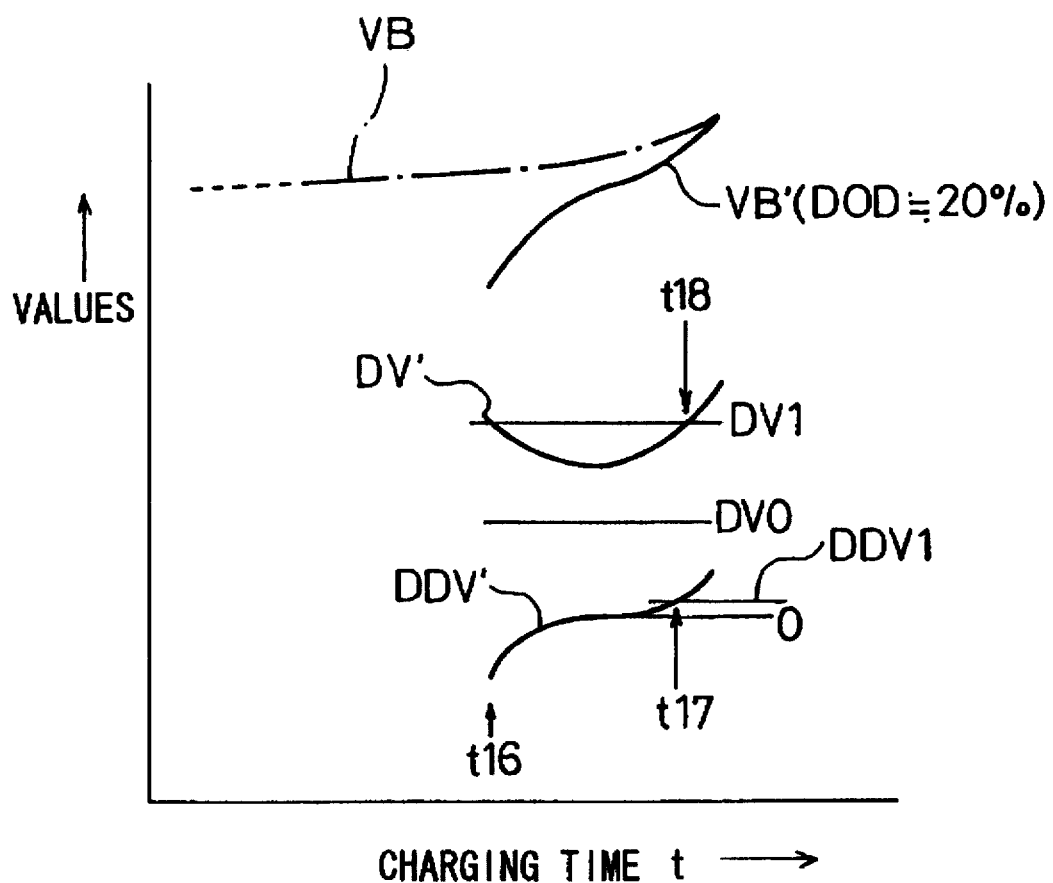
FIG. 7 is a diagram illustrative of a halfway charging control process.

Specifically, if the battery 11 starts being charged from a condition in which the depth of charge (DOD) thereof is of a relatively low value of about 35% or less, then as shown in FIG. 7, when the battery 11 starts being charged from a time t16, a voltage VB'(DOD=20%) across the battery 11 increases more sharply than if the voltage VB increases with a larger DOD as indicated by the dot-and-dash-line curve in FIG. 7. Therefore, the decision step S11 (DV=DV'<DV0) is not satisfied. At a time t17, however, the decision step S13 (DDV=DDV'>DDV1) is satisfied, and the decision step S15 (FDV=1) is also satisfied. At a time t18, the decision step S19 (DV=DV'>DV1) is satisfied.

Since the battery is not fully charged in this case, the decision unit 27 continuously charges the battery 11 for a certain time in the step S22, and then supplementarily charges the battery 11 in the step S10, after which the charging process comes to an end.

In the above embodiment, basically, the battery 11 is charged in the first stage with a large current after the time t13 when the voltage VB across the battery 11 becomes equal to or greater than the decision value DDV1 while the battery 11 is being charged, until the time t14 when the primary differential DV of the voltage VB reaches the decision value DV1 which is a threshold for the primary differential DV which is established depending on the temperature TB of the battery 11. When the primary differential DV reaches the decision value DV1 at the time t14, the charging of the battery 11 with the large current is finished, and then the battery 11 is supplementarily charged in the second stage in the step S10.

By monitoring the quadratic differential DDV which does become zero or smaller in the initial charging period L, it is possible to distinguish an increase in the voltage VB in the initial charging period L from an increase in the voltage VB in the terminal charging period K. After an increase in the voltage VB in the terminal charging period K is detected with the quadratic differential DDV (DDV>DDV1), the decision value DV1 is acquired depending on the temperature TB, and the end of the charging process is decided (DV>DV1) based on the decision value DV1 for the primary differential DV of the voltage VB. While the battery 11 is being charged, the internal pressure PB and the primary differential DP are also monitored.

Therefore, it is possible to charge the battery 11 to the adequately fully charged condition, which is approximately a 95% fully charged condition, i.e., a truly fully charged condition, so that the battery 11 is prevented from being unduly degraded and is allowed to have an increased service life. The charging process in the second stage may be dispensed with because it is a uniform charging process. However, the charging process in the second stage is effective to eliminate differences between the capacities of the unit cells due to charging efficiency differences between the unit cells.

According to the present invention, as described above, the secondary battery is charged a large current after the quadratic difference of the voltage across the secondary battery becomes equal to or greater than a predetermined value while the secondary battery is being charged, until the primary differential of the voltage reaches a threshold for the primary differential of the voltage which is established depending on the temperature of the secondary battery. When the primary differential reaches the threshold value, the charging of the secondary battery with the large current is finished.

By monitoring the quadratic differential, it is possible to distinguish an increase in the voltage in the initial charging period from an increase in the voltage in terminal charging period. After an increase in the voltage in terminal charging period is detected, the end of the charging process is decided based on the primary differential of the voltage. Therefore, it is possible to reliably charge the secondary battery to the adequately fully charged condition, which is approximately a 95% fully charged condition. Since the secondary battery is not excessively charged, the secondary battery is prevented from being unduly degraded due to excessive charging and is allowed to have an increased service life.

Furthermore, when the internal pressure of the secondary battery reaches a predetermined value or greater or the primary differential of the internal pressure of the secondary battery reaches a predetermined value or greater while the secondary battery is being charged, the charging of the secondary battery with a large current is finished. Accordingly, degrading of the secondary battery can reliably be detected.

Moreover, after the primary differential of the voltage reaches a threshold, the secondary battery is charged with a small current rather than a large current. Therefore, in the case where the secondary battery comprises unit cells, all the unit cells can be fully charged.

According to the present invention, furthermore, when the quadratic differential of the voltage reaches a predetermined value or greater, the secondary battery is charged with a large current until the primary differential of the voltage reaches a threshold therefor which is established depending on the temperature of the secondary battery. When the primary differential of the voltage does not drop below a given lower limit while the secondary battery is being charged with the large current, the secondary battery is continuously charged with the large current for a predetermined time after the primary differential reaches the threshold. Consequently, the secondary battery can reliably be charged even if the DOD thereof is low.

In addition, a voltage change decision means of the controller decides whether or not the quadratic differential of the voltage detected by the voltage sensor reaches a predetermined value or greater. When the quadratic differential of the voltage reaches the predetermined value or greater, a charged condition decision means decides whether the primary differential of the voltage across the secondary battery reaches a threshold therefor which is established depending on the temperature detected by the temperature sensor. A large current charging control means charges the secondary battery with a large current until the primary differential of the voltage across the secondary battery reaches the threshold therefor. Inasmuch as the end of the charging process is decided based on the quadratic differential of the voltage and the primary differential of the voltage, the secondary battery can reliably be charged to the adequately fully charged condition, which is approximately a 95% fully charged condition. As the secondary battery is not excessively charged, the secondary battery is prevented from being unduly degraded due to excessive charging and is allowed to have an increased service life.

Therefore, it can be determined whether the secondary battery is charged to the adequately fully charged condition in various charging environments, and the secondary battery can be fully charged to a truly fully charged condition is effectively prevented from being unduly degraded.

Although a certain preferred embodiment of the present invention has been shown and described in detail, it should be understood that various changes and modifications may be made therein without departing from the scope of the appended claims.

What is claimed is:

1. A method of controlling the charging of a secondary battery, comprising the steps of:

deciding whether or not a quadratic differential of a voltage across the secondary battery while the secondary battery is being charged reaches at least a predetermined value;

if said quadratic differential reaches at least the predetermined value, charging the secondary battery with a large current until a primary differential of the voltage across the secondary battery reaches a threshold therefor which is established depending on a temperature of the secondary battery; and terminating charging of the secondary battery with the large current when the primary differential of the voltage across the secondary battery reaches the threshold therefor.

2. A method according to claim 1, further comprising the step of providing a supplemental charge to the secondary battery with a current smaller than the large current after the preliminary differential of the voltage across the secondary battery reaches the threshold therefor.

3. A method according to claim 1, wherein the charging of the secondary battery with the large current is terminated when an internal pressure of the secondary battery reaches at least a predetermined value while the secondary battery is being charged with the large current.

4. A method according to claim 3, further comprising the step of providing a supplemental charge to the secondary battery with a current smaller than the large current, after the primary differential of the voltage across the secondary battery reaches the threshold therefor.

5. A method according to claim 1, wherein the charging of the secondary battery with the large current is terminated when a primary differential of the internal pressure of the secondary battery reaches at least a predetermined value while the secondary battery is being charged with the large current.

6. A method of controlling the charging of a secondary battery, comprising the steps of:

deciding whether a quadratic differential of a voltage across the secondary battery while the secondary battery is being charged reaches at least a predetermined value or not;

if said quadratic differential reaches at least the predetermined value, charging the secondary battery with a large current until a primary differential of the voltage across the secondary battery reaches a threshold therefor which is established depending on a temperature of the secondary battery; and if a primary differential of the voltage across the secondary battery does not become at most a predetermined lower limit while the secondary battery is being charged with the large current, continuing to charge the secondary battery with the large current for a predetermined time after the primary differential of the voltage across the secondary battery reaches said threshold therefor.

7. A method according to claim 6, further comprising the step of providing a supplemental charge to the secondary battery with a current smaller than the large current, after the primary differential of the voltage across the secondary battery reaches the threshold therefor.

8. A method according to claim 7, wherein the charging of the secondary battery with the large current is terminated when an internal pressure of the secondary battery reaches at least a predetermined value while the secondary battery is being charged with the large current.

9. A method according to claim 8, further comprising the step of providing a supplemental charge to the secondary battery with a current smaller than the large current, after the primary differential of the voltage across the secondary battery reaches the threshold therefor.

10. A method according to claim 7, wherein the charging of the secondary battery with the large current is terminated when a primary differential of the internal pressure of the secondary battery reaches at least a predetermined value while the secondary battery is being charged with the large current.

11. An apparatus for controlling the charging of a secondary battery, comprising:

a voltage detector for detecting a voltage across a secondary battery;

a temperature detector for detecting a temperature of the secondary battery; and a controller for controlling a charging current supplied to the secondary battery;

said controller comprising:

voltage change decision means for deciding whether or not a quadratic differential of the voltage detected by said voltage detector reaches at least a predetermined value;

charged condition decision means for deciding whether a primary differential of the detected voltage reaches a threshold therefor which is established depending on the temperature detected by said temperature detector when the quadratic differential of the detected voltage reaches at least said predetermined value as decided by said voltage change decision means; and large current charging control means for charging the secondary battery with a large current until the primary differential of the detected voltage reaches said threshold therefor.

12. An apparatus according to claim 11, wherein said controller further comprises small current charging means for providing a supplemental charge to the secondary battery with a current smaller than the large current, after the primary differential of the detected voltage reaches said threshold therefor.

13. An apparatus according to claim 11, further comprising a pressure detector for detecting an internal pressure of said secondary battery, and indicating means for indicating degrading of the secondary battery when the internal pressure detected by said pressure detector reaches at least a predetermined value.

14. An apparatus according to claim 12, further comprising a pressure detector for detecting an internal pressure of said secondary battery, and indicating means for indicating degrading of the secondary battery when the internal pressure detected by said pressure detector reaches at least a predetermined value.

15. An apparatus according to claim 11, further comprising a pressure detector for detecting an internal pressure of said secondary battery, and indicating means for indicating degrading of the secondary battery when a differential of the internal pressure detected by said pressure detector reaches at least a predetermined value.

16. An apparatus according to claim 12, further comprising a pressure detector for detecting an internal pressure of said secondary battery, and indicating means for indicating degrading of the secondary battery when a differential of the internal pressure detected by said pressure detector reaches at least a predetermined value.

* * * * *